United States Patent [19]

Reid

[11] Patent Number: 4,765,232
[45] Date of Patent: Aug. 23, 1988

[54] PORTABLE COOKOUT

[76] Inventor: Joyce P. Reid, 1316 W. 115th St., Chicago, Ill. 60643

[21] Appl. No.: 915,995

[22] Filed: Oct. 8, 1986

Related U.S. Application Data

[63] Continuation-in-part of Ser. No. 628,896, Jul. 9, 1984, abandoned.

[51] Int. Cl.[4] .................. A47J 27/00; A47J 37/07; A47J 43/18
[52] U.S. Cl. .................................. 99/427; 99/443 C; 99/448; 99/450
[58] Field of Search ................ 99/427, 402, 400, 393, 99/446, 450, 421 H, 433 C, 421 P, 448, 341; 126/9 R, 25 R, 41 B

[56] References Cited

U.S. PATENT DOCUMENTS

| | | | |
|---|---|---|---|
| 2,760,428 | 8/1956 | Boyajian | 99/402 X |
| 2,860,568 | 11/1958 | Magee | 99/446 X |
| 2,895,408 | 7/1959 | Glenny | 99/402 |
| 3,045,582 | 7/1962 | Wells | 99/427 X |
| 3,104,605 | 9/1963 | McKinney | 99/421 H |
| 3,361,055 | 1/1968 | Hondroulis | 99/341 |
| 3,648,010 | 3/1972 | Schier | 99/427 X |
| 4,165,683 | 8/1979 | Van Gilst | 99/427 X |
| 4,362,093 | 12/1982 | Griscom | 99/25 R X |
| 4,421,016 | 12/1983 | Sich | 99/402 |
| 4,442,762 | 4/1984 | Beller | 99/427 |
| 4,470,343 | 9/1984 | Didier | 99/427 |

Primary Examiner—H. Hampton Hunter
Attorney, Agent, or Firm—A. R. Thiele

[57] ABSTRACT

A portable device for cooking food consists of a rotatable spit and basket assembly, a housing enclosure and a mounting cart. The rotatable spit and basket assembly is positioned within the housing enclosure and is rotated by an electric motor. The housing enclosure has a hinged top and hinged doors which provides access to the rotatable spit and basket assembly. The housing enclosure is supported by the mounting cart.

10 Claims, 2 Drawing Sheets

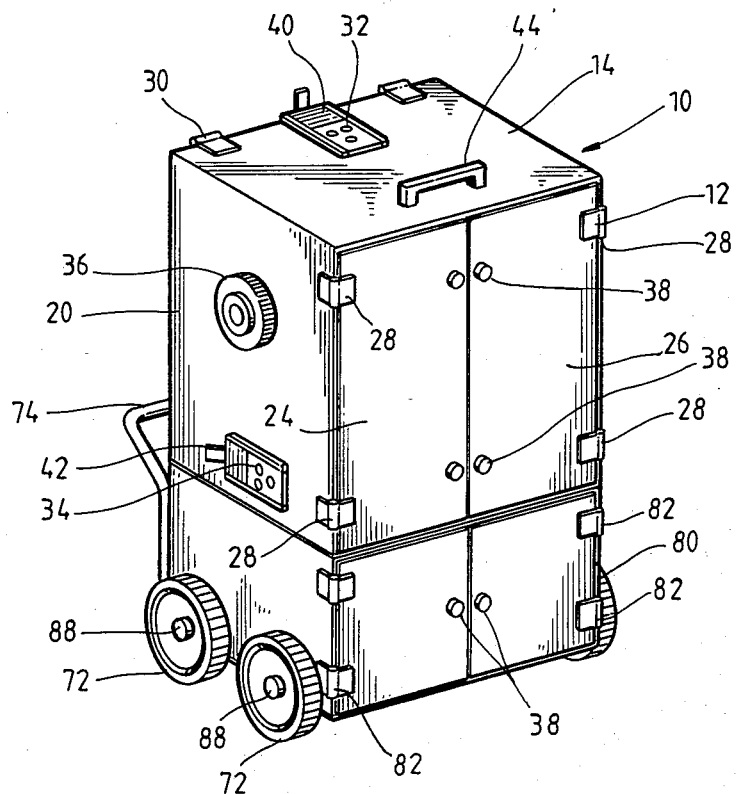
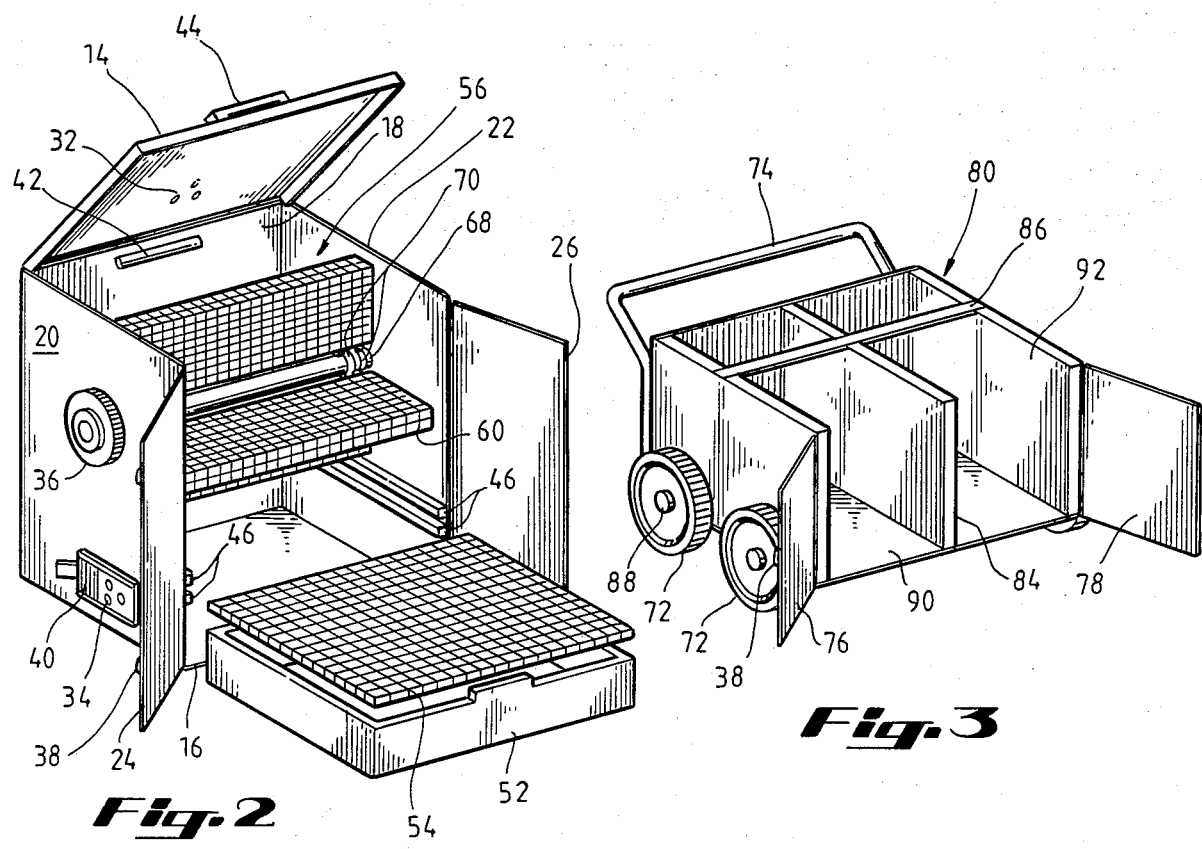
Fig.1
Fig.2
Fig.3

PORTABLE COOKOUT

BACKGROUND OF THE INVENTION

This application is a continuation-in-part of U.S. Pat. application No. 628,896 filed July 9, 1984 now abandoned.

This invention relates to a portable device for cooking food. More specifically this invention relates to a device for the cooking of food wherein the food is placed in baskets and the baskets are rotated within an enclosure over a heat source.

During recent years it has become popular to cook food in an outdoor setting. In order to allow a broad range of foods to be cooked in an outdoor setting more and more sophisticated devices have been developed for the cooking of food outdoors. Typical of these devices are those found in U.S. Pat. Nos. 4,034,662; 2,895,405; 2,760,428; 3,025,783; 3,566,777; 3,802,331 and 3,698,376. While each of these devices has solved particular problems with regard to the handling or the cooking of food the problem still remains of providing a device which will allow for the cooking of foods whose preparation requires frequent turning in an enclosed environment such as in an oven. Additionally the rate of cooking must be adjustable to compensate for various types of food and the need for various temperature during the cooking process. Further, the need also exists to provide the ability to cook various foods without comingling them within a single carrier or on a single grill surface. Finally, the device should provide for easy disassembly and cleaning of all parts when the cooking process has been completed.

SUMMARY OF THE INVENTION

The portable device for cooking food of the present invention consists of three main assemblies. The first assembly is a combination of baskets mounted on a rotatable spit member. The baskets consist of a bottom and a hinged cover. The hinged cover is attached to the bottom and allows for the placement of food within the basket. Each basket is removably attached to the rotatable spit member. The spit and basket assembly is rotatably mounted within the second major assembly of the invention, the housing enclosure.

The housing enclosure is constructed essentially in the shape of a rectangular parallelepiped. The top of the housing is hinged to the back of the housing and may be swung away to gain access to the spit and basket assembly from above or to control the temperature with the housing enclosure. Further access to the spit and basket assembly or control of cooking temperature may be obtained by opening the hinged doors on the front of the housing. When the doors and the top of the housing enclosure are closed cooking vapors may escape from the housing by adjustable vents located in the back of the housing, the top of the housing and on the sides of the housing. A motor is affixed to one end of the rotatable spit member on one side of the housing enclosure to rotate the spit and basket assembly within the housing. The ability to open the top and the doors of the housing not only provides easy access to the food as it cooks but also provides for easy cleaning of the housing once the cooking of the food has been completed.

The housing further includes a tray-like container for holding a source of heat such as charcoal or brickets. This container may be positioned with respect to the rotatable spit and basket assembly by resting it on one of several pair of interior mounting rails which are affixed to the sides of the housing. The slidable mounting of the container makes it easy to remove and clean.

Underneath the heat source container is a catch-tray which rests on the base of the housing enclosure to catch ashes from the heat source and drippings from the food being cooked. The catch-tray may be slid out of the housing for cleaning.

The third major assembly is a mounting cart which is sized to provide mounting and portability for the housing enclosure. The mounting cart itself may also include doors for gaining access to the interior of the mounting cart in which food, cooking equipment or possibly a battery power source for the motor may be stored. Wheels provide for movement of the mounting cart when an integral handle is pulled or pushed.

BRIEF DESCRIPTION OF THE DRAWINGS

A better understanding of the portable device for cooking food of the present invention may be had by reference to the figures wherein:

FIG. 1 is a perspective view of the portable device for cooking food of the present invention;

FIG. 2 is a perspective view of the housing and spit and basket assembly with the top and door members open to reveal the contents of the interior;

FIG. 3 is a perspective view of the mounting cart with the housing removed;

DETAILED DESCRIPTION OF THE EMBODIMENTS

Figure 4:
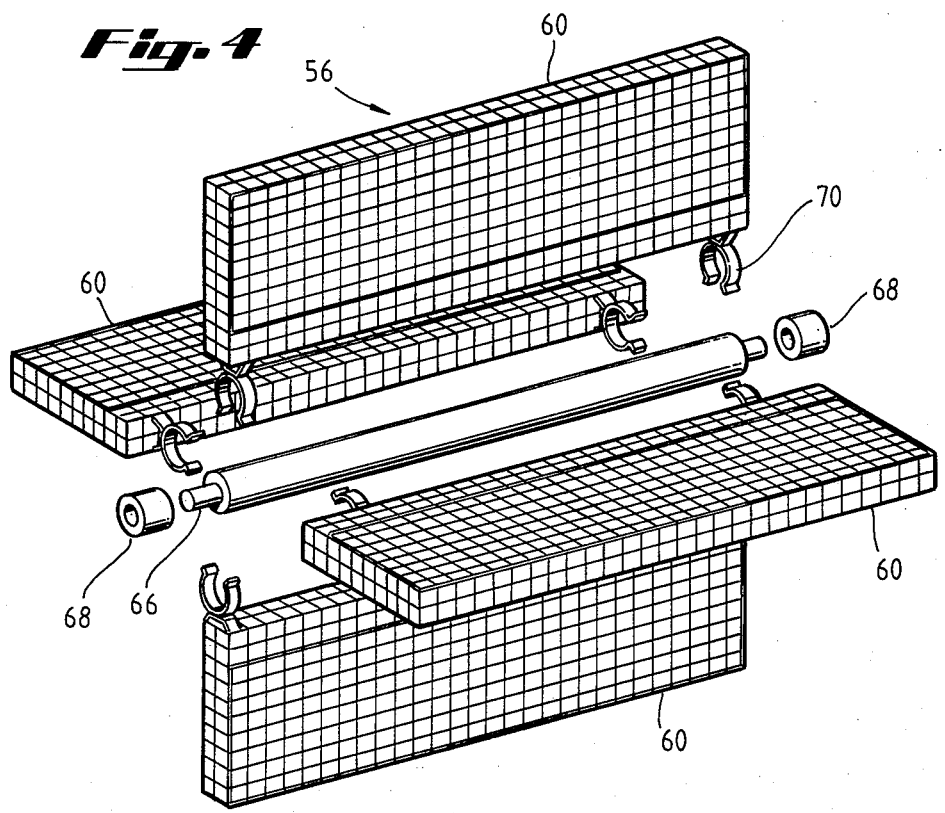
FIG. 4 is a perspective exploded view of the spit and basket assembly.

FIG. 1 is a perspective view of the portable device for cooking food 10 of the present invention. Shown particularly in FIG. 1 are two of the three major assemblies which make up the present invention. The third major assembly is the spit and basket assembly shown in FIGS. 4 and 5. Housing enclosure 12 rests upon mounting cart 80 and provides for the rotatable mounting of spit and basket assembly generally 56. As can be further seen in FIG. 2 spit and basket assembly is rotatably mounted on bearings 68 which are positioned within sides 20 and 22, respectively of housing enclosure 12. These bearings may be sleeve, roller or ball-type bearings. Also positioned on side 20 is motor 36 which is affixed to the end of spit 66 to provide rotation for the spit and basket assembly 56. While an electric motor is shown in the preferred embodiment, a spring driven motor, a compressed air motor or a hand crank will also suffice.

As may be further seen in FIGS. 1 and 2 access to the interior of housing 12 may be gained by rotating top 14 up and away on hinge 30 as shown in FIG. 2. Doors 24 and 26, respectively, may be also swung open by hinges 28 to further gain access to spit and basket assembly 56.

Also contained within housing 12 is a heat source container 54 which is used to contain charcoal or brickets (not shown). Heat source container 54 is positioned with respect to the spit and basket assembly by one of several sets of parallel mounting rails 46 which are affixed to sides 20 and 22 of housing 12. Positioned under heat source container 54 is a drip tray 52 which rests on base 16 of housing 12. Further included within housing 12 is a light 42 which may be mounted on the back 18 of housing 12.

Optionally included on housing 12 are vent 32 in top 14 and vent 34 in side 20. Although not shown in any of the figures additional vents may be included on back 18 and side 24. The vent consists of three small holes as shown by the underside of vent 32 in top 14. The outside of the vent consists of a slidable door for covering the three holes as shown in vent 34 on side 20. While three small holes with a cover are shown, it will be understood that any suitable opening configuration may be used. As it is anticpated that during the cooking of food within device 10 housing 12 will become too hot to touch, heat insulating knobs 38 have been included on doors 24 and 26 and a heat insulating handle 44 has been placed on top 14.

Housing 12 is moved from place to place on mounting cart 80. Cart 80 is made portable by the use of wheels 72 which are affixed by the use of spindles 88 or an axle. The interior spaces 90 and 92, respectively, of mounting cart 80 may be used for containing utensils or items to be cooked or for just general storage. If desired, spaces 90 and 92 may be used for a battery pack if motor 36 on housing 12 is to be powered by battery power. It has been found that the addition of brace 86 and divider 84 will strengthen mounting cart 80 so that it will support housing 12. Doors 76 and 78 are opened to gain access to interior spaces 90 and 92 of mounting cart 80. When housing 12 is mounted on mounting cart 80 handle 74 may be used to roll portable device for cooking food 10 from place to place.

Figure 5:
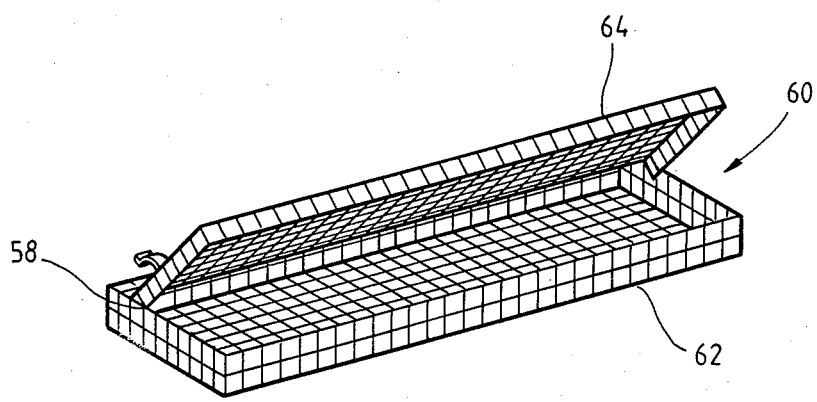
FIG. 5 is a perspective view of the basket assembly with a cover opened.

FIG. 5 illustrates the basket 60 which is used for holding food. The basket consists of a bottom 62 and a cover 64 which when opened along hinge 58 provides access to the interior of basket 60. Baskets 60 are mounted on spit 66 by the use of spring clips 70 as shown in FIG. 4. While spring clips 70 are shown in the preferred embodiment it will be understood that any suitalbe mechanical attachment method may be used. A plurality of baskets 60 is recommended for use to rotatably balance spit and basket assembly 56 within housing 12.

OPERATION

The portable device for cooking food 10 of the present invention is designed for use out-of-doors. Typically such cooking is done in a backyard or in a part where venting of cooking vapors is provided by ambient air. The portable cooking device for cooking food 10 is designed so that it may be disassembled into its mounting cart portion 80 and housing 12. It may be easily placed within the trunk of an automobile or hand-carried outside into the yard of a residential dwelling. To reassemble device 10, housing 12 is placed on cart member 80. Once assembled cart member 80 and housing 12 may be positioned with respect to the sun or to the wind. This is accomplished by movement of cart member 80 and housing 12 using handle 74, which when pulled or pushed causes wheels 72 to roll.

Food is positioned within baskets 60 by placing the food on bottom 62 and closing cover 64 over the food. The baskets 60 are then mounted on spit 66 by the use of mounting clips 70. Mounting clips 70 hold baskets 60 in position with respect to spit 66.

While food is being prepared and being placed within baskets 60, charcoal or brickets may be lighted while on heat source container 54. Heat source container 54 is then positioned within housing 12 on a selected set of parallel mounting rails 46.

When it is time to cook the food within portable device 10, baskets 60 and shaft assembly 56 are rotated over heat source 54. The rigid position of baskets 60 with respect to spit 66 allows all sides of the food contained within baskets 60 to be exposed to the heat from heat source container 54. Regulating the amount of heat received by the food within baskets 60 is accomplished by positioning heat source container on mounting rails 46. While the food is cooking top 14 and doors 24 and 26 are selectively closed or opened to contain or vent the heat from heat source container 54 within housing 12. If desired various vents 34 and 32 may be opened to allow for the escape of smoke and food vapors.

When the food is completely cooked baskets 60 may be removed from spit 66 and the food removed therefrom and served.

After the cooking of food has been completed cleaning of the device is accomplished by removing heat source container 54 which may then be placed under a source of water in order to completely remove and scrub any debris left from the charcoal or brickets. Drip tray 52 may also be removed and cleaned and scrubbed independently from device 10. Basket and spit assembly 56 may also be removed and cleaned. With heat source 54 removed drip tray 52 removed and baskets 60 removed the interior portions of housing 12 are also exposed and may be easily cleaned.

Housing 12 and mounting cart 80 may be constructed from aluminum or steel or any other rigid material suitable for easy fabrication and operability under high heat conditions. The pieces which form the sides, bottoms, back, etc. of mounting cart 80 and housing 12 may be joined together by welding or mechanical assembly techniques. In the alternative all may be formed together as a single unit. Handle 44, knobs 38 and knobs 88 are typically formed of a nonheat conducting material so that they may be used to open the housing 12 while food is being cooked. Spit 66 is typically formed of a rigid material such as steel, aluminum or brass which provides for rigidity, ease of fabrication and resistance to oxidation and corrosion under high heat conditions. Baskets 60 are formed with a plurality of holes or from expanded metal or an openwork-type rigid metal fabric so that heat and cooking vapors may surround and permeate the food as it cooks.

It is now shown that the present invention provides for the cooking of food in an oven-like environment positioned on a portable cart while also providing for frequent turning of the food and cooking temperature adjustment. Additionally, the various types of food being cooked may be individually segregated. When the cooking is complete, the entire device may be easily cleaned.

Those skilled in the art will readily realize that there are teachings of the foregoing invention with regard to a portable device for cooking food incorporated within those herein described, and it is therefore intended that the scope of the present invention with regard to a portable device for cooking food be limited not by the foregoing disclosure, but rather only by the appended claims.

I claim:

1. A portable device for cooking food in an enclosed space comprising:

a plurality of baskets constructed and arranged to contain food, said baskets including a portion for holding food and a hinged cover;

a rotatable spit member;

a plurality of clips for attaching said baskets to said rotatable spit member;

a housing constructed and arranged for the rotatable mounting of said rotatable spit member, said housing further defining a base member, a back member including an adjustable vent, two side members, said side members including centrally located rotatable supports for said rotatable spit member and adjustable vent, a top member including an adjustable vent hingedly affixed to said back member and two door members positioned in front of said rotatable spit member for gaining access to said rotatable spit member, said two door members being hingedly affixed to each of said side members, respectively;

said door members and said top member being selectively opened or closed during the cooking process;

means for rotating said rotatable split member and said baskets attached thereto;

a removable heat source container constructed and arranged to contain brickets or charcoal, said heat source container being accessible through said door members and slidably mounted within said housing under said rotatable spit member so as to be positionable with respect to said rotatable spit member and said baskets and not to obstruct the rotation of said rotatable spit member and said baskets;

a removable tray member accessible through said door members, said tray member being constructed and arranged to rest on said base member under said heat source container; and a mounting cart constructed and arranged to mount said housing, said mounting cart including a plurality of wheels and a handle.

2. The portable device for cooking food as defined in claim 1 wherein said baskets include a plurality of holes.

3. The portable device for cooking food as defined in claim 1 wherein said spit member further includes bearings upon which said spit member may rotate.

4. The portable device for cooking food as defined in claim 1 wherein said housing further includes adjustable vents.

5. The portable device for cooking food as defined in claim 1 wherein said housing further includes a device for illuminating the interior of the housing.

6. The portable device as defined in claim 1 for cooking food wherein said base member, said back member and said two side members are welded together at their edges.

7. The portable device for cooking food as defined in claim 1 wherein said means for rotating said spit member and said baskets is an electric motor.

8. The portable device for cooking food as defined in claim 1 wherein said heat source container includes a plurality of holes.

9. The portable device for cooking food as defined in claim 1 wherein said mounting cart further includes doors.

10. A portable device for cooking food in an enclosed space comprising:

a plurality of baskets including a hinged cover, said baskets constructed and arrange to contain food;

a rotatable spit member including support bearings at either end;

a plurality of clips for attaching said baskets to said rotatable spit member;

a housing constructed and arranged for the rotatable mounting of said rotatable spit member, said housing further defining a base member, a back member including an adjustable vent, two side members, said side members including centrally located rotatable supports for said rotatable spit member and an adjustable vent, a top member including an adjustable vent hingedly affixed to said back member, and two door members positioned in front of said rotatable spit member for gaining access to said rotatable spit member, said two doors members being hingedly affixed to each of said side members, respectively;

an electric motor attached to the end of said rotatable spit member for the purpose of rotating said rotatable spit member and said baskets as a unit;

a removable heat source container constructed and arranged to contain brickets or charcoal, said heat source container being accessible through said door members and being slidably mounted on rail members located within said housing on said side members of said housing, said removable heat source container being positioned with respect to said rotatable spit member so as to not obstruct the rotation of said rotatable spit member and said baskets;

a removable tray member accessible through said door members, said removable tray member being constructed and arranged to rest on said base member of said housing under said heat source container; and a mounting cart constructed and arranged to mount said housing, said mounting cart including doors for gaining access to the interior of said mounting cart, wheels for moving said mounting cart and a handle.

* * * * *